(12) United States Patent
Das et al.

(10) Patent No.: US 12,267,097 B2
(45) Date of Patent: Apr. 1, 2025

(54) METHODS AND DEVICES FOR DEVICE ORIENTATION TO IMPROVE SIGNAL QUALITY AND SAR COMPLIANCE

(71) Applicant: Intel Corporation, Santa Clara, CA (US)

(72) Inventors: Sajal Kumar Das, Bangalore (IN); Sudeep Divakaran, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 951 days.

(21) Appl. No.: 17/128,248

(22) Filed: Dec. 21, 2020

(65) Prior Publication Data

US 2022/0200648 A1    Jun. 23, 2022

(51) Int. Cl.
*H04B 1/3827* (2015.01)
*G06F 3/04883* (2022.01)
*H01Q 1/24* (2006.01)
*H04B 7/06* (2006.01)
*H04W 52/36* (2009.01)

(52) U.S. Cl.
CPC ....... *H04B 1/3838* (2013.01); *G06F 3/04883* (2013.01); *H01Q 1/245* (2013.01); *H04B 7/0617* (2013.01); *H04W 52/367* (2013.01)

(58) Field of Classification Search
CPC ............. H04B 1/3838; H04B 7/0617; G06F 3/04883; H01Q 1/245; H04W 52/367
See application file for complete search history.

(56) References Cited

U.S. PATENT DOCUMENTS

| | | | |
|---|---|---|---|
| 10,812,125 B1 | 10/2020 | Badic et al. | |
| 2013/0237171 A1* | 9/2013 | Lindoff | H04W 52/0274 455/343.1 |
| 2014/0129051 A1* | 5/2014 | Gautama | H04W 4/40 701/2 |
| 2015/0189686 A1 | 7/2015 | Kasher | |
| 2016/0088465 A1* | 3/2016 | Golla | H04W 8/205 455/450 |
| 2019/0199405 A1 | 6/2019 | Islam et al. | |
| 2021/0058831 A1* | 2/2021 | Sharma | H04W 36/28 |
| 2022/0148446 A1* | 5/2022 | Brandao | G08G 5/0052 |

OTHER PUBLICATIONS

European Search Report issued for the corresponding European Application No. 21 19 4836.9, dated Mar. 10, 2022, 10 pages (for informational purposes only).
H. Okamoto et al., "Machine-Learning-Based Future Received Signal Strength Prediction Using Depth Images for mmWave Communications", arXiv, dated Mar. 26, 2018, 13 pages.

* cited by examiner

*Primary Examiner* — Michael Thier
*Assistant Examiner* — Nevena Zecevic Sandhu
(74) *Attorney, Agent, or Firm* — Viering, Jentschura & Partner mbB

(57) ABSTRACT

Devices and methods for automatically determining and suggesting an optimal device orientation with respect to a partner communication device. The methods and devices may include features to determine a position of a user with respect to the device; estimate a direction of a partner communication device; perform a comparison of the direction of the partner communication device with the position of the user; and based on the comparison, determine whether to generate an instruction to suggest a change in orientation of the device.

18 Claims, 10 Drawing Sheets

900

902

1000

Rotate the device by 90 degree

METHODS AND DEVICES FOR DEVICE ORIENTATION TO IMPROVE SIGNAL QUALITY AND SAR COMPLIANCE

TECHNICAL FIELD

Various aspects relate generally to wireless communications including communication link quality and radiation exposure control in beamforming technologies.

BACKGROUND

Many emerging communication technologies, such as 5G New Radio (NR) and WiGig, utilize Multi-Input and Multiple-Output (MIMO) systems enabling beamforming in the millimeter-wave (mmWave) spectrum. These systems use higher radio frequency (RF) waves and energies in focused directions to improve throughput, among other advantages. However, while beamforming in mmWave communications provides faster and more robust communication, it also increases RF radiation in its environment, including users, and is subject to higher attenuation due to the characteristics of mmWaves. For example, when a device uses beamforming to focus its transmissions in a narrow direction, the resulting beam may deliver more RF energy to a focused area. When this focused area is pointed at a user, the device may deliver high levels of radiation to the user and the signal quality may also be significantly degraded. The amount of radiation energy emitted absorbed by a unit of mass of a user over time is termed the specific absorption rate (SAR).

Various regulators, including the Federal Communications Commission (FCC) and the International Commission on Non-Ionizing Radiation Protection (ICNIRP), and standardization bodies like the 3$^{rd}$ Generation Partnership Project (3GPP) have introduced stringent requirements that limit the amount of radiation that a device can deliver to users. Accordingly, methods and devices with mechanisms to reduce radiation exposure to users while also maintaining high levels of link quality to improve user experience are desired.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
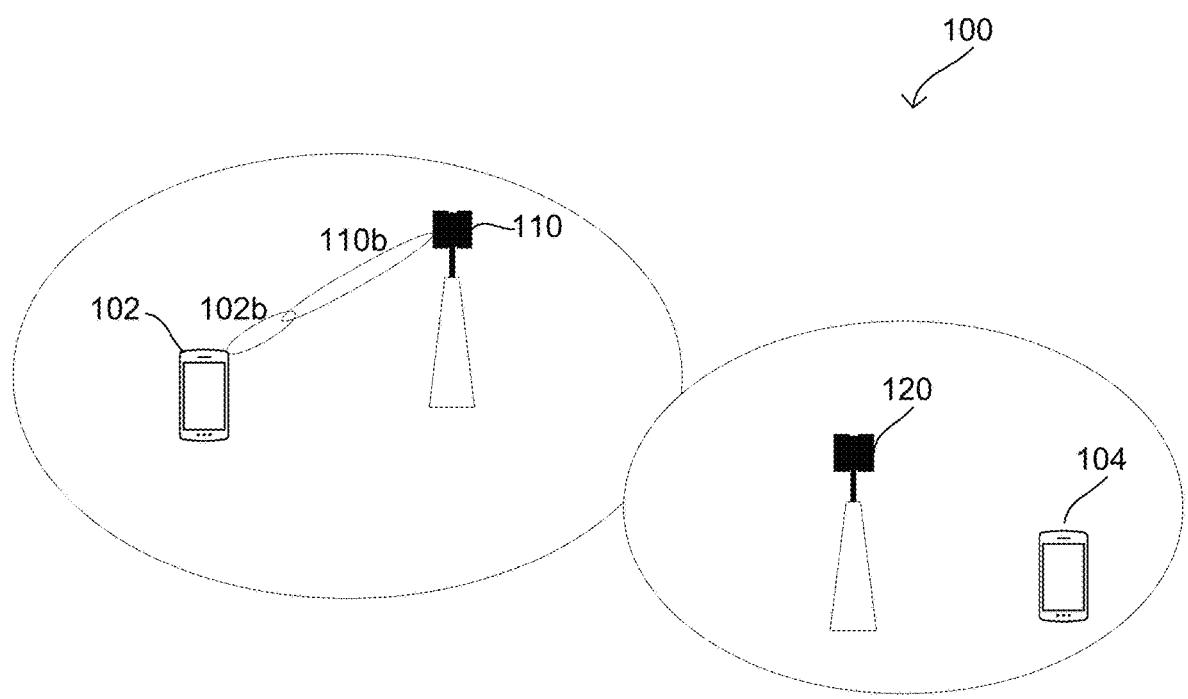
FIG. 1 exemplarily shows a radio communication network according to some aspects.

User devices such as laptops, tablets, cell phones, etc. are increasingly using cellular modems (i.e., baseband modems or processors) for maintaining an "always connected user experience" (ACPC). Currently, due to the rapid growth in wireless data traffic, mmWave communications have shown tremendous potential to meet the demand in 5G communication systems and beyond. Beamforming and pencil beam antenna arrays are expected to become a major component in 5G mmWave networks to achieve significant advantages using pencil-type beam radiation lobes with more narrow and more focused radiation directions. Beamforming is a method used to create a radiation pattern of an antenna array by constructively adding the weights of signals in the direction of signal-of-interest (SOI) and nulling the pattern in the undesired direction.

Furthermore, one of the major consumers of internet data traffic are video applications such as video streaming, video conferencing, etc. With larger displays, laptops and tablet-type terminal devices with 5G cellular modems will be more amiable for performing these tasks. While watching video or video conferencing with others, for example, a user will generally stay in front of the display for long periods of time. As the location of the network access node, known as a gNodeB or gNB in 5G communications, may not be known to the user while using the terminal device (laptop, tablet, cellphone, or another wireless device), the user may position themselves in between the gNB and the cellular modem of the terminal device. This may introduce high levels of interference or block the signal due to the characteristic of mmWaves (e.g., waves in the frequency spectrum between 30-300 GHz) being highly attenuated by physical objects.

A user blocking, either partially or completely, the signal beam may therefore present several problems. First, the signal quality may significantly degrade. Second, radiation hazards may be posed to the user that exceed SAR thresholds set forth by regulatory authorities. The SAR thresholds may be based on an energy budget available for transmissions over a time window.

The degradation of the signal quality is attributed to the characteristics of mmWaves that make them highly susceptible to blocking which impose communication limitations owing to their poor signal attenuation compared with those of microwave signals. A user body between the terminal device cellular modem and the partner communication device (e.g., a network access node or other terminal device) may cause a poor signal quality and lower data throughput. This may additionally result in increased power consumption at the terminal device side. Furthermore, the radiation from signals transmitted in the mmWave spectrum is higher than the radiation of previous communication systems. The electromagnetic waves are absorbed by tissue in the human body and may cause damage if exposure levels are high for longer periods of time. Accordingly, regulatory authorities have imposed compliance thresholds to ensure that SAR do not exceed certain limits. Both of these problems may be more severe in 5G and NR communications compared to prior generation technologies due to the increased use of mmWave and narrow beam schemes.

Previous solutions such as using a best antenna selection or reducing transmit power may not be optimal solutions for maintaining high communication link quality with increased throughput and reduced latency in MIMO and beamforming systems.

In some aspects, methods and devices are configured to determine a position of a user and a direction of a partner communication device with respect to the terminal device, e.g., a laptop, tablet, mobile phone, etc. Afterwards, a comparison of the position of the user with the direction of the partner communication device is made to ascertain whether the user is intercepting a main beam with the partner communication device. If it is determined that the user is affecting the main beam (i.e., a line of sight (LoS) between the cellular/baseband modem of the terminal device and the partner communication device), the terminal device may issue a notification recommending a change in the orientation of the terminal device. This notification may be issued via a user interface like an alert message on a display screen, a notification via an LED light, speaker, a sound alert, or a vibration alert. Furthermore, the methods and devices herein provide for computation of an optimum transmission (Tx) power based on the fact that the user is impacting the beam. This may include dynamically determining whether to use a lower power level, for example, whilst the user is interfering with the beam. If the user is determined to not be impacting the beam with the partner communication device, then a computation of an optimum Tx power based on the running use-case (e.g., video streaming, video conference, etc.) and the proximity of the user may be performed to increase Tx signal performance (e.g., in the uplink direction with a network access node).

The devices and methods of this disclosure provide advantages which include improved signal reception quality and throughput received by the terminal device, improved signal transmission quality and throughput transmitted from the terminal device, reduced power usage, and reduced radiation exposure to the user.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wireless Local Area Network (WLAN) Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies)., and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" may encompass one or both of transmitting and receiving, i.e., unidirectional or bidirectional communication in one or both of the incoming and outgoing directions. The term "calculate" may encompass both 'direct' calculations via a mathematical expression/formula/relationship and 'indirect' calculations via lookup or hash tables and other array indexing or searching operations.

Figure 2:
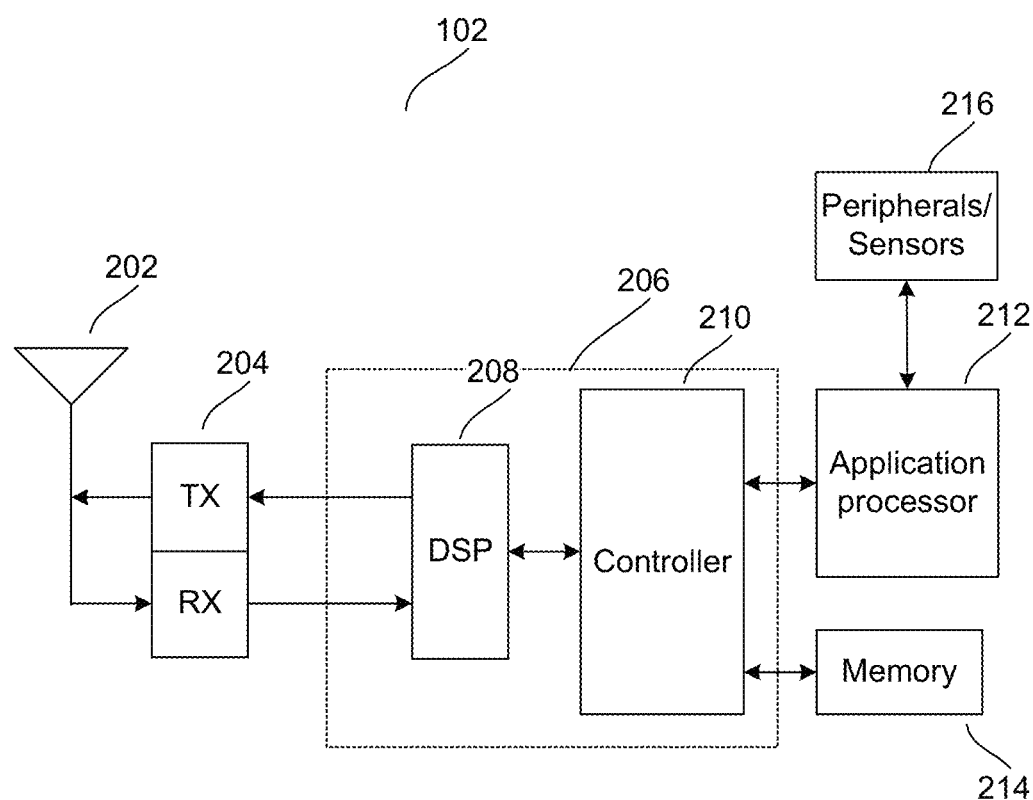
FIG. 2 exemplarily shows an internal configuration of terminal device according to some aspects.

FIGS. 1 and 2 depict an exemplary network and terminal device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., 5G, NR, LTE, or other 3rd Generation Partnership Project (3GPP) networks, WLAN/WiFi, Bluetooth, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., gNBs, eNodeBs, NodeBs, Base Transceiver Stations (BTSs), or any other type of base station), while terminal devices 102 and 104 may be cellular terminal devices (e.g., laptops, computers, tablets, Mobile Stations (MSs), User Equipments (UEs), or any type of device with wireless communication capabilities). Network access nodes 110 and 120 may therefore interface (e.g., via backhaul interfaces) with a cellular core network such as a 5G core network, an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include 5G, LTE, UMTS, GSM, WiMAX, WiGig, Bluetooth, WLAN, etc., any of which may be applicable to radio communication network 100.

Figure 3A:
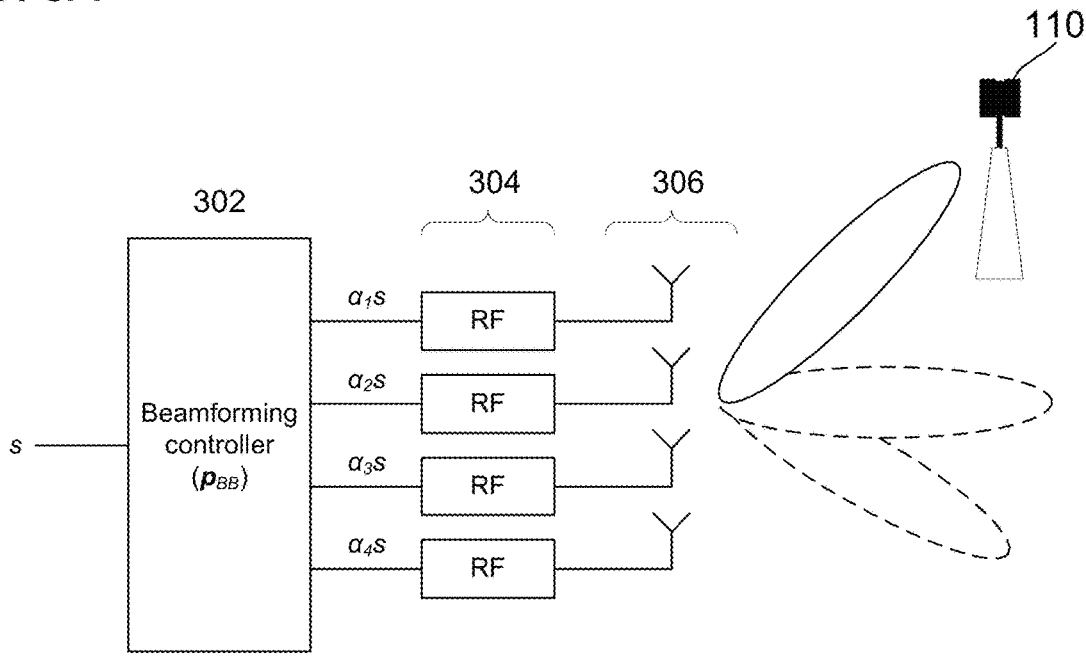
FIGS. 3A-3B exemplarily show beamforming architectures according to some aspects.
Figure 3B:
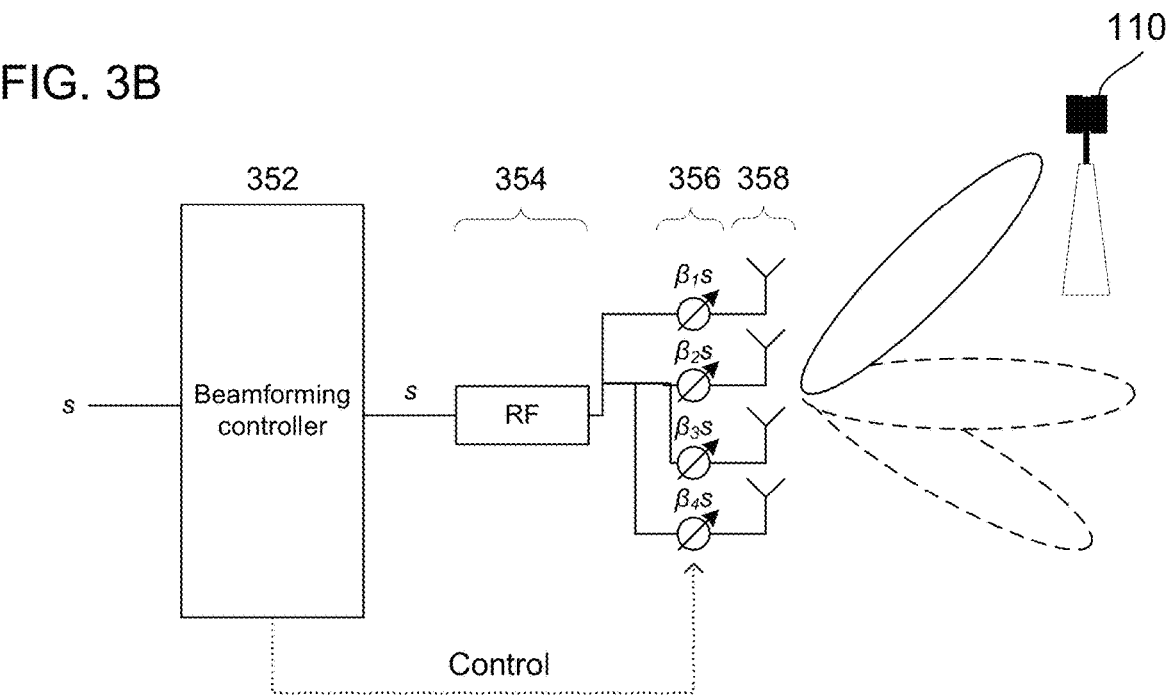

As shown in radio communication network 100, terminal device 102 and network access node 110 may each use beamforming techniques 102b and 110b, respectively, for communicating with one another. Each may have at least one RF chain and multi-antenna arrays as shown in FIGS. 3A-3B. Accordingly, the devices shown in network 100 may be capable of bi-directional beamforming. If a user is in the direction of the beam 102b, for example, the user may be subject to increased SAR levels. In order to comply with regulatory measures, terminal device 102 may need to implement mechanisms so that the amount of energy transmitted in the direction of the user does not violate (i.e., go over) an energy budget. However, in addition to complying with these regulatory measures, terminal device 102 must also attempt to maintain a robust wireless link with network access node 110 to ensure communication quality is not degraded.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Baseband modem 206 may also be referred to as "baseband processor," "cellular modem," or the like. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), sensor(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FI, in some aspects antenna system 202, RF transceiver 204, digital signal processor 208, and/or protocol controller 210 can encompass separate components dedicated to different radio communication technologies. Accordingly, while antenna system 202, RF transceiver 204, digital signal processor 208, and controller 210 are shown as individual components in FIG. 2, in some aspects antenna system 202, RF transceiver 204, digital signal processor 208, and/or controller 210 can encompass separate components dedicated to different radio communication technologies.

FIG. 3A illustrates a simplified digital baseband beamforming architecture that digitally applies complex beamforming weights (composed of both a gain and phase factor) in the baseband domain. It is appreciated that components of FIG. 3A may correspond to components depicted in FIG. 2. For example, beamforming controller 302 may be included as part of the baseband modem 206 and antenna array 306 may correspond to antenna system 202.

As shown in FIG. 3A, beamforming controller 302 may receive baseband symbol s and subsequently apply a complex weight vector $p_{BB}=[\alpha_1\ \alpha_2\ \alpha_3\ \alpha_4]^T$ to s to generate $p_{BB}$s, where each element $\alpha_i$, i=1,2,3,4 is a complex weight (comprising a gain factor and phase shift). Each resulting element $[\alpha_1 s\ \alpha_2 s\ \alpha_3 s\ \alpha_4 s]^T$ of $p_{BB}$s may be baseband symbol s multiplied by some complex weight $\alpha_i$. Beamforming controller 302 may then map each element of $p_{BB}$s to a respective RF chain of RF system 304, which may each perform digital to analog conversion (DAC), radio carrier modulation, and amplification on the received weighted symbols before providing the resulting RF symbols to a respective element of antenna array 306. Antenna array 306 may then wirelessly transmit each RF symbol. This exemplary model can also be extended to a multi-layer case where a baseband symbol vector s containing multiple baseband symbols $s_1$, $s_2$, etc., in which case baseband precoding vector $p_{BB}$ may be expanded to a baseband precoding matrix $p_{BB}$ for application to baseband symbol vector s. In this case, $\alpha_i$, i=1,2,3,4 are row vectors, and $p_{BB}s=[\alpha_1 s\ \alpha_2 s\ \alpha_3 s\ \alpha_4 s]^T$. Thus, after multiplying $p_{BB}$ and s, the overall dimension is the same as the overall dimension at the output of beamforming controller 302. The below descriptions thus refer to beamforming controller 302 as $p_{BB}$ and transmit symbol/vector as s for this reason while this model can be extended to further dimensions as explained.

By manipulating the beamforming weights of $p_{BB}$, beamforming controller 302 may be able to utilize each of the four antenna elements of antenna array 306 to produce a steered beam that has greater beam gain than a single antenna element. The radio signals emitted by each element of antenna array 306 may combine to realize a combined waveform that exhibits a pattern of constructive and destructive interference that varies over distances and direction from antenna array 306. Depending on a number of factors (such as antenna array spacing and alignment, radiation patterns, carrier frequency, and the like), the various points of constructive and destructive interference of the combined waveform can create a focused beam lobe that can be "steered" in direction via adjustment of the phase and gain factors $\alpha_1$ of $p_{BB}$. FIG. 3A shows several exemplary steered beams generated by antenna array 306, which beamforming controller 302 may control by adjusting $p_{BB}$. Although only steerable main lobes are depicted in the simplified illustration of FIG. 3A, beamforming controller 302 may be able to comprehensively "form" the overall beam pattern including nulls and sidelobes through similar adjustment of $p_{BB}$.

Beamforming controller 302 may also perform adaptive beamforming, where beamforming controller 302 dynamically changes the beamforming weights in order to adjust the direction and strength of the main lobe in addition to nulls and sidelobes. With these adaptive approaches, beamforming controller 302 can steer the beam in different directions over time, which may be useful to track the location of a moving target point (e.g. a moving receiver or transmitter). In a radio communication context, beamforming controller 302 may identify the location of a target recipient 110 (e.g. the direction or angle of network access node 110 relative to antenna array 306) and subsequently adjust $p_{BB}$ in order to generate a beam pattern with a main lobe pointing towards network access node 110, thus improving the array gain at network access node 110 and consequently improving the receiver performance. Through adaptive beamforming, beamforming controller 302 may be able to dynamically adjust or "steer" the beam pattern as the direction of network access node 110 changes in order to continuously provide focused transmissions to network access node 110 (or conversely focused reception).

In some aspects, beamforming controller 302 may be implemented as a microprocessor. Beamforming controller 302 therefore may be able to exercise a high degree of control over both gain and phase adjustments of $p_{BB}$ with digital processing. However, as shown in FIG. 3A for RF system 304 and antenna array 306, digital beamforming configurations may use a dedicated RF chain for each element of antenna array 306 (where each RF chain performs radio processing on a separate weighted symbol $\alpha_i$s provided by beamforming controller 302); i.e. $N_{RF}=N$ where $N_{RF}$ is the number of RF chains and N is the number of antenna elements.

Contrasting with the beamforming controller architecture of FIG. 3A, FIG. 3B shows an RF beamforming approach. It is appreciated that components of FIG. 3B may correspond to components depicted in FIG. 2. For example, beamforming controller 352 may be included as part of the baseband modem 206 while antenna array 358 may correspond to antenna system 202.

As shown in FIG. 3B, beamforming controller 352 may provide baseband symbol s to RF transceiver 354. RF transceiver 354 may perform RF transmit processing on baseband symbol s and provide the resulting symbol s to each of phase shifters 356. In the example shown in FIG. 3B, phase shifters 356 may include four phase shifters 356 that each apply a respective phase shift $\beta_1$ to $\beta_4$ to s. In some aspects, phase shifters 356 may be analog RF phase shifters that apply their respective phase shifts in the analog RF domain. Phase shifters 356 may provide the resulting phase-shifted symbols $\beta_1 s$ to $\beta_4 s$ to antenna array 358. The respective antennas of antenna array 358 may wirelessly transmit the phase-shifted symbols. Similar to the operation of FIG. 3A's digital beamformer, FIG. 3B's RF beamformer may realize a specific antenna pattern by selecting the phase weights $\beta_1$ to $\beta_4$. Accordingly, beamforming controller 352 may be configured to select phase weights $\beta_1$ to $\beta_4$, such as based on the direction of recipient device 110 (e.g., network access node), and provide the phase weights to $\beta_1$ to $\beta_4$ to phase shifters 356 (with the "Control" line shown in FIG. 3B). Beamforming controller 352 may therefore steer the main antenna beam towards recipient device 110 through proper selection of the phase weights $\beta_1$ to $\beta_4$. In some cases, the phase weights may be phase-only (e.g., only a phase shift with no amplitude change); in other aspects, the phase weights may have a phase and a gain component (e.g., a phase shift and an amplitude gain).

Referring back to FIG. 2, terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

Peripherals and/or sensors 216 may be operably coupled to the application processors 212. The peripherals may include user input/output devices such as display(s), keypad(s), touchscreen(s), speaker(s), external button(s), LED lights, microphone(s), etc., or other related components. Sensors may include devices which acquire data about the terminal device 102 environment such as camera(s), LIDAR sensor(s), radar sensor(s), other proximity sensor(s), inertial measurement unit (IMU) sensor(s), or the like.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 120. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112.

Figure 4:
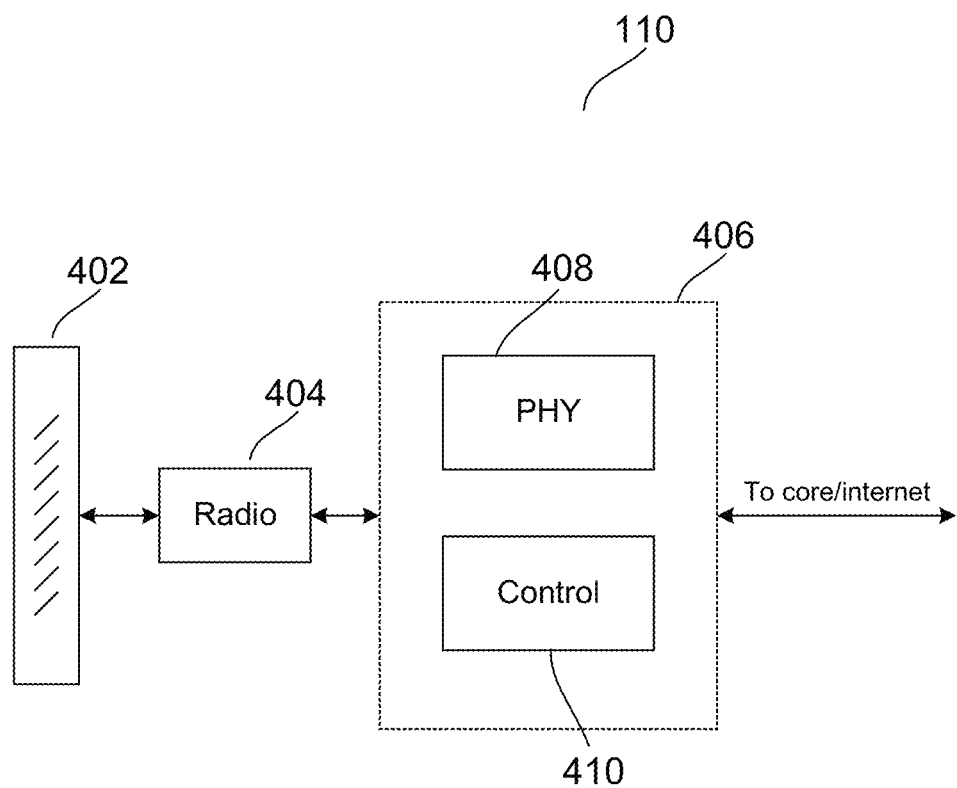
FIG. 4 exemplarily shows an internal configuration of a network access node in some aspects.

FIG. 4 shows an exemplary internal configuration of a network access node, such as network access node 110, according to some aspects. As shown in FIG. 4, network access node 110 may include antenna system 402, radio transceiver 404, and baseband subsystem 406 (including physical layer processor 408 and protocol controller 410). In an abridged overview of the operation of network access node 110, network access node 110 may transmit and receive wireless signals via antenna system 402, which may be an antenna array including multiple antennas. Radio transceiver 404 may perform transmit and receive RF processing to convert outgoing baseband samples from baseband subsystem 406 into analog radio signals to provide to antenna system 402 for radio transmission and to convert incoming analog radio signals received from antenna system 402 into baseband samples to provide to baseband subsystem 406. Physical layer processor 408 may be configured to perform transmit and receive PHY processing on baseband samples received from radio transceiver 404 to provide to controller 410 and on baseband samples received from controller 410 to provide to radio transceiver 404. Controller 410 may control the communication functionality of network access node 110 according to the corresponding radio communication technology protocols, which may include exercising control over antenna system 402, radio transceiver 404, and physical layer processor 408. Each of radio transceiver 404, physical layer processor 408, and controller 410 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 404 may be a radio transceiver including digital and analog radio frequency processing and amplification circuitry. In some aspects, radio transceiver 404 may be a software-defined radio (SDR) component implemented as a processor configured to execute software-defined instructions that specify radio frequency processing routines. In some aspects, physical layer processor 408 may include a processor and one or more hardware accelerators, wherein the processor is configured to control physical layer processing and offload certain processing tasks to the one or more hardware accelerators. In some aspects, controller 410 may be a controller configured to execute software-defined instructions that specify upper-layer control functions. In some aspects, controller 310 may be limited to radio communication protocol stack layer functions, while in other aspects controller 410 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

The methods and devices of this disclosure dynamically detect the presence of a user affecting a main beam direction (e.g., LoS with a partner communication device) and provide an indication about changing the orientation of the device so as to achieve an optimum signal quality and a lower radiation hazard to the user so as to comply with SAR regulations.

Figure 5:
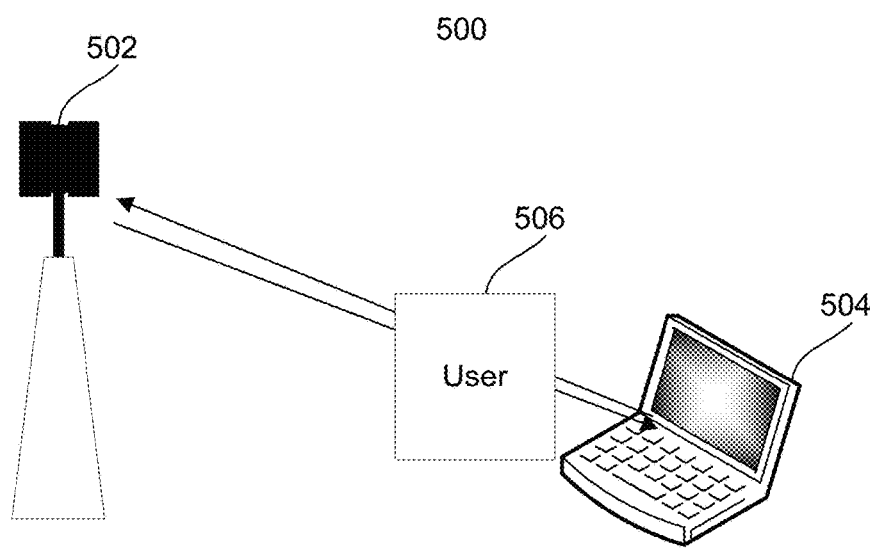
FIG. 5 exemplarily shows scenarios according to some aspects.
Figure 5:
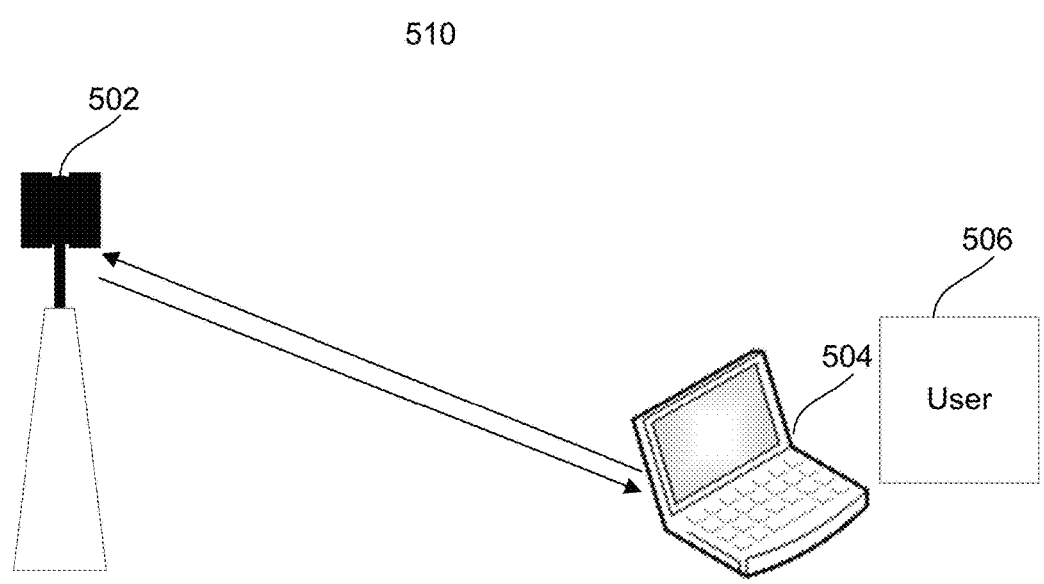

FIG. 5 shows two exemplary scenarios 500 and 510 according to some aspects. In FIG. 5, the partner communication device is shown as a gNB, but it is appreciated that other partner communication devices (e.g., other terminal devices, a WLAN AP, other network access nodes, etc.) are covered by this disclosure. Similarly, the terminal device is depicted as a laptop, but other terminal devices (e.g., tablets, cellphones, etc.) are also included within the scope of this disclosure.

In scenario 500, the user 506 is positioned between the terminal device 504 and the gNB 502. More specifically, the user 506 is positioned between the cellular modem transmitter/receiver of the terminal device 504 and the transmitter/receiver system of the gNB 502. The user 506, therefore, may be interfering with one or more of the downlink beams from the gNB 502 to terminal device 504 or the uplink beam from the terminal device 504 to the gNB 502. This may cause a significant degradation in the quality of the wireless link between the terminal device 504 and the gNB 502, particularly in the case that beamforming in mmWave is being used. Furthermore, the user 506 may be subject to increased RF radiation exposure, particularly if the user remained in this position for extended periods of time, e.g., if the user is streaming a movie.

In scenario 510, the user 506 is no longer positioned between the terminal device 504 and the gNB 502. This may be the optimum orientation for the terminal device 504 enabling high throughput and decreased latency times in both the uplink and downlink directions with the gNB 502. For example, in the case of a laptop, this orientation may be with the laptop display facing away from the gNB if the cellular modem (i.e., baseband modem and/or transceiver) are located beneath the display screen.

The methods and devices of this disclosure are configured with mechanisms to notify users of optimum positioning configurations with respect to the terminal device and also to optimize transmit powers for communicating with partner communication devices.

Figure 6:
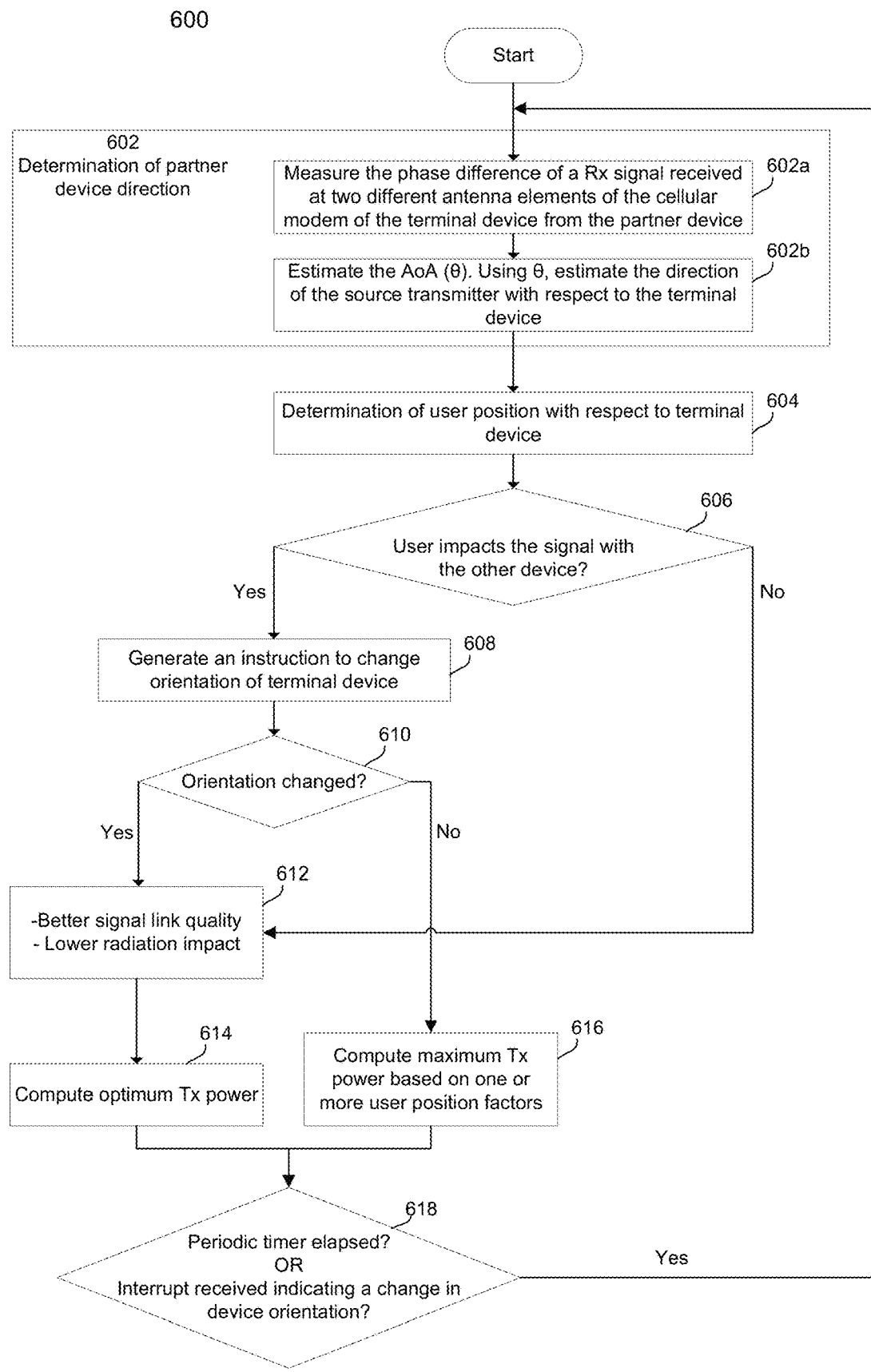
FIG. 6 exemplarily shows a process flowchart according to some aspects.

FIG. 6 shows an exemplary flowchart 600 illustrating a method for determining an optimum device orientation and transmit power according to some aspects.

In 602, the direction of the partner communication device with respect to the terminal device is determined. The determination of the direction of the partner communication device may include 602a and 602b. To locate the partner communication device radio transmitter in a terrestrial environment, a direction-finding (i.e., radio beam transmitter direction finding) technique is used to determine the angle of arrival (AoA) at the monitoring/receiving side. The amplitude and phase of the incoming signal may be measured and used for determining the transmitting signal source direction.

Figure 7:
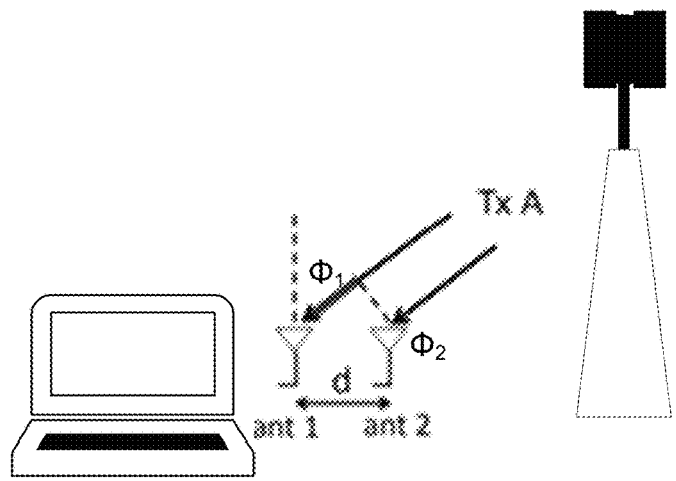
FIGS. 7-8 exemplarily show diagrams for determining a direction of a partner communication device according to some aspects.

The AoA of an RF signal received at the antenna array of the terminal device may be estimated by detecting and comparing the signal's phase when it arrives at multiple antenna elements of the antenna array 602a. FIG. 7 shows an exemplary diagram 700 describing this in greater detail.

As shown in 700, due to the difference in propagation differences from the signal source (i.e., the gNB) to individual receive antennas (e.g., ant 1 and ant 2), each antenna observes a different phase shift of the signal. While only two antenna elements (ant 1 and ant 2) of the antenna array are shown in 700, it is appreciated that the process may be scalable to other amounts, e.g., antenna arrays with four or eight antenna elements. The AoA is a function of the measured phase difference between the antenna elements and the antenna element separation distance (d). As shown in 700, the transmitted signal (Tx A) may propagate from the gNB, and the phase observed at by the two receive antenna elements (ant 1 and ant 2) of the terminal device is may be Φ1 and Φ2, respectively. The phase difference between the two antenna elements (Φ1-Φ2) can be represented as a function of the AoA (θ) and the distance separating the antennas (d):

$$\Phi 1 - \Phi 2 = (2\pi d \sin \theta)/\lambda$$

where λ is the wavelength of the RF signal. Since the distance (d) between the antenna elements is known based on the physical configuration of the device and the wavelength λ is known based on the radio access technology (RAT) protocol being used, the measured phase differences between the two antenna elements allow for the device to determine the AoA (θ) of the incoming signal.

Figure 8:
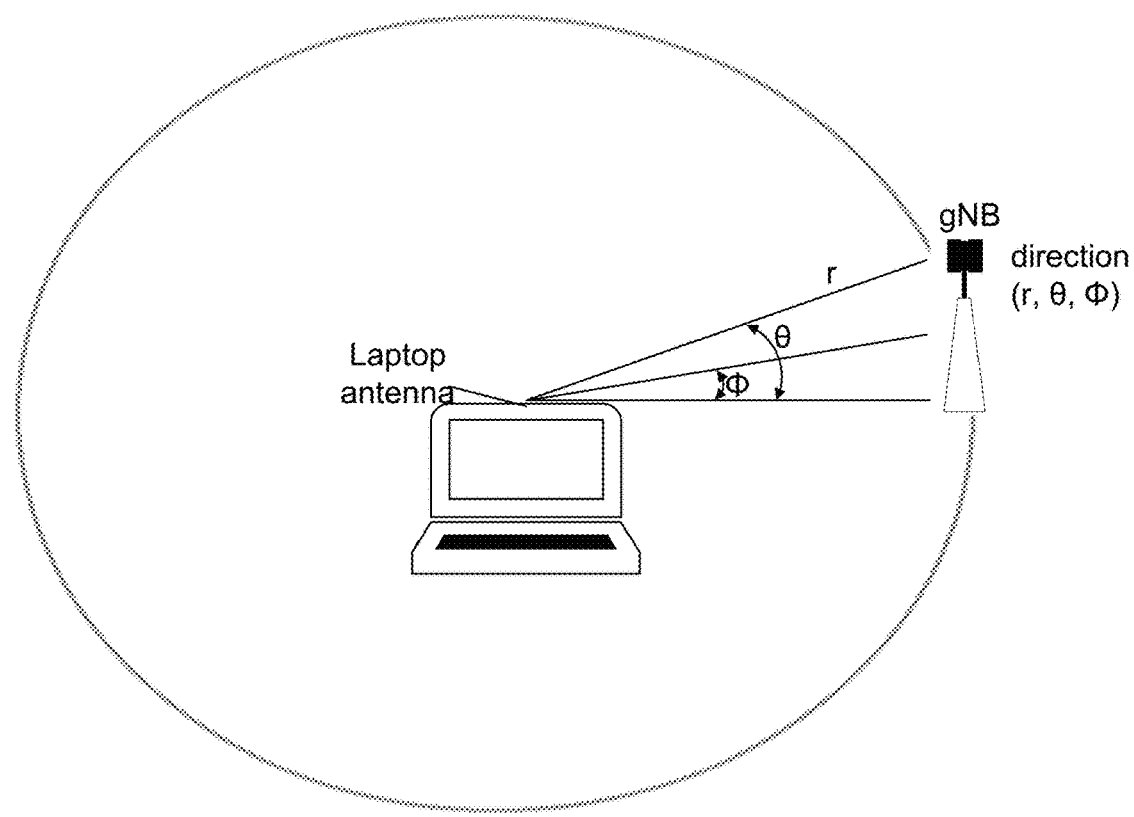

Referring back to flowchart 600, once the phase difference of the received (Rx) signal between two or more antenna elements is determined in 602a, the AoA (θ) can be estimated using formula (I) in 602b. Using the AoA (θ), the direction of the source transmitter (i.e., of the partner communication device) may be determined with respect to the terminal device 602b. The direction of the source transmitted (e.g., gNB) is shown more detail in diagram 800 in FIG. 8.

Once the AoA (θ), i.e., the incident angle, received at the antenna system of the terminal device is estimated, the direction of the partner communication device (e.g., the gNB) with respect to the terminal device may be determined based on the knowledge of the device configuration knowledge, i.e., the location of the antenna system in the terminal device. In other words, based on the AoA and the antenna system location information in the terminal device (e.g., the location information of the cellular communications antenna array in a laptop), the direction of the gNB in 3D space (with parameters r, θ, Φ) is easily estimated. In some aspects, the precise location, including distance to the gNB, may not be critically important since knowledge of the direction of the gNB may be enough.

Referring back to flowchart 600, in addition to determining the direction of the partner communication device in 602, the method may include determining the user position with respect to the terminal device 604. This may be done before, concurrent, or after the determining of the direction of the partner communication device.

The user position 604 may be determined in any one of a number of manners. In some aspects, the user position may be determined based on data obtained from sensors such as LIDAR, infrared sensors, cameras, etc. In other aspects, the user position may be determined based on user context information and knowledge of the physical configuration of the terminal device. For example, if a video is streaming on a laptop terminal device, the user position may be determined based on the direction the display screen is facing, and, in conjunction with information of the hardware layout of the terminal device, the user position may be estimated with respect to the antenna structure. In some aspects, a combination of the aforementioned user positioning techniques may be used. For example, the display screen position along with data obtained from a camera mounted above the display screen may provide a more accurate estimation of the user position.

Once the user position and the partner communication device direction are estimated with respect to the antenna array system of the terminal device, the terminal device may then determine whether the user impacts the signal path 606, which may include the user completely or partially blocking the signal path between the partner communication device and the antenna system of the terminal device. This determination may be made based on a comparison of the user position with the direction of the partner communication device.

For example, if the user is detected as being in front of a laptop display screen and the gNB is estimated to be in the same general direction (as shown in 500), the terminal device may determine that the user impacts (i.e., interferes)

with the communication signaling with the partner communication device. The terminal device may therefore be configured to then generate instructions to provide a notification to the user to change the orientation of the terminal device 608. However, when the user body is determined not to impact the signal with the partner communication device (as shown in 510), then the method may proceed directly to 612.

Figure 9:
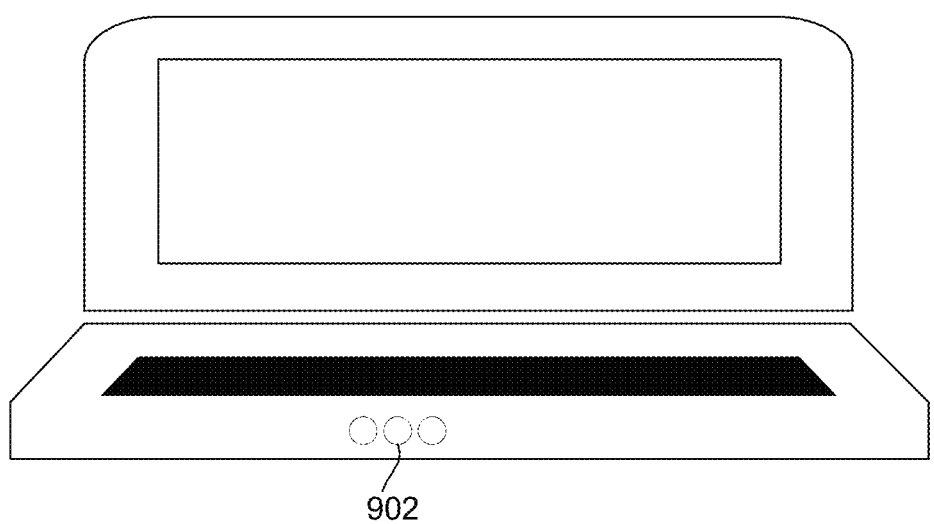
FIGS. 9-10 exemplarily show notifications according to some aspects.
Figure 10:
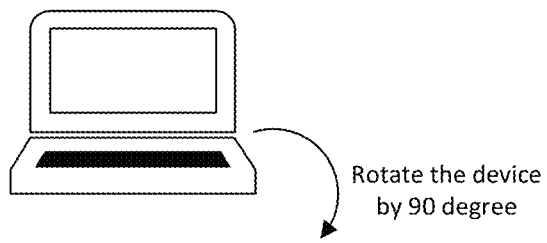

The instructions generated in 608 may include one or more of several types of notifications. These notifications may be issued as a message or alert on a display screen of terminal device, a flashing of an LED light located on the terminal device, a sound notification via a speaker, or a vibration notification. FIGS. 9-10 show exemplary illustrations 900 and 1000, respectively, of example notification messages. In 900, a visual notification to change an orientation of the device is provided via an LED light 902 on the bezel or base of the laptop. In 1000, an exemplary notification which may be provided on a display screen is shown. As shown in 1000, the notification may include additional instructions how to change the orientation of the device (i.e., in this example, rotate 90 degrees clockwise) so as to provide a more unimpeded direct LoS between the antenna structure of the terminal device and the partner communication device. The additional instructions may include a message indicating how many degrees to rotate the terminal device and/or a message indicating a distance to move the terminal device in a certain direction.

The additional instructions for rotating the terminal device a certain number of degrees may be based on the comparison performed in 606. For example, if the user is determined to directly in between the cellular modem of the terminal device and the partner communication device (e.g., gNB), the instructions may suggest a rotation of 180 degrees. However, it is appreciated that this is merely an example, and the instructions may include a device rotation of anywhere up to 180 degrees in either the clockwise or counterclockwise directions.

In 610, the method includes checking to see if the orientation of the terminal device has been changed. In some aspects, this may include performing steps 602-606 again and determining if there was a change to either of the partner communication device direction and/or the user position with respect to the terminal device. In some aspects, this may include (additionally or in the alternative) determining a change in device orientation based on data obtained from one or more sensor inputs, e.g., from a camera or an IMU sensor.

If the orientation of the terminal device has been changed, e.g., according to the recommendation provided in the notification, the signal link quality may improve and the radiation hazard to the user may be reduced 612. Accordingly, there may be no direct beam interception or blocking by the user with the partner communication device and the terminal device may compute the optimum transmission (Tx) power accordingly 614. The Tx power may be increased to a suitable optimum value considering the application running on the terminal device (e.g., video streaming) and user proximity to the device. The user proximity to the device may be determined based on information provided by sensors of the terminal device, for example. Since there is no (or minimal) user interference with the signal quality, the Tx power may be set to a higher value for better signal quality.

If the orientation of the device is determined to have not been changed in 610, the maximum Tx power may be determined based on one or more user position factors 616. These factors may include reducing the Tx energy so as to minimize SAR exposure to the user to comply with regulatory limits or reducing the Tx energy realizing that optimum link quality may not be able to be established at the moment due to the user position to conserve power.

In these cases, where changing the device orientation may not possible or if the user does not comply with the instruction in the notification to change the orientation, a higher Tx power will cause more radiation impact on user body as it lies on the direct path of the beam. Accordingly, the terminal device may lower the Tx power by considering that the user body is intercepting the beam. The transmit power computed in 616 may therefore be lower than the transmit power computed in 614.

The Tx powers computed in either 614 or 616 may be computed based on the user position with respect to the terminal device (i.e., whether the user impacts the beams transmitted between the two devices) and/or the applications that are currently in use at the terminal device. For example, if the user is determined to be very close to the terminal device (laptop, tablet, etc.), the radiation impact of the transmissions from the terminal device is greater. Depending on the application in use, the terminal device may be able to estimate a distance to the user body. Table I below provides non-limiting examples of use case types and user body positioning based on these use case types. A look up table (LUT) with similar information may be stored in a memory of the terminal device for easy access.

TABLE I

| Use Case Type | Example Use-Case | Human Body Shadowing Possible | Laptop Lid Orientation |
|---|---|---|---|
| Video Streaming | Movie streaming | Hands and Body likely to be far from device. User detection needed though. | Lid Open Display in attached/detached mode |
| Typing | Online Editing | Hands/Body close to device | Lid Open Display in attached/detached mode |
| Conference all | Audio/Video call | Hands and Body likely to be far from device. User detection needed though. | Lid Open Display in attached/detached mode |
| Gaming | Video Game | Depends on gaming accessory used. User detection needed though. | Lid Open Display in attached/detached mode |
| No Display Wireless Use-case | Audio streaming | Hands and Body likely to be far from device. Detection needed. | Lid can be Open or Closed |
| On Docking Station | Any of the above use-cases | Separate Keyboard & Display may be used. But Hands and Body could still near device. User detection needed | Lid can be Open or Closed |

The terminal device may use a LUT like the one shown above to help in determining user proximity. In some aspects, information from sensor and/or peripheral inputs may be used as well, or in the alternative, to detect the user position. These inputs may include data obtained from a camera or LIDAR sensor, keyboard activity checks, touch screen activity checks, or the like.

The process for determining the Tx power setting in either 614-616 may therefore be based on three factors. The first factor is the position of the user. The second factor is the use-case (i.e., application) that is running. The third factor is the proximity of the user with respect to the terminal device. In some aspects, this third factor may be more specifically determining the proximity of the user to the terminal device modem and/or transceiver. Based on these three factors, the method 600 may provide clues and/or recommendation to the user in the form of visual indications on how to orient the laptop device to ensure best signal reception from gNB so that the direct beam does not penetrate the user. Also, the terminal device may automatically check user proximity and adjust the device Tx power for better cover and throughput by checking the kind of use-case that is running and, in conjunction with the sensor or user-activity input, it can decide whether it can configure the modem transceiver to increase or decrease the Tx power. In this manner, the terminal device may achieve improved transmit performance without violation of SAR regulations.

Referring back to flowchart 600, the method may also include the use of a periodic time or receiving an interruption indicating a change in device orientation 618 to determine when to commence the method again. The timer may have a periodicity that is dynamically adjusted based on the operating environment of the terminal device. For example, the periodicity of the timer may be longer in a static environment (e.g., the terminal device and the user are stationary at a desk in a building) than in a dynamic environment (e.g., the user and terminal device are on a train).

In some aspects, the interruption indicating a change in device orientation may be triggered by device movement to restart method 600. The device movement can be determined based on input from an inertial measurement unit (IMU) sensor operably coupled to the application processor, for example.

The method shown in flowchart 600 may be implemented between the application processor 212, the baseband modem (i.e., cellular modem) 206, and any other dedicated controllers that may track the device states (e.g., physical state or power state). The functionality split may be as follows. The baseband modem may be configured to determine the partner communication device location information and calculate any blockage or impedance of signal received from the partner communication device. In other words, the baseband modem may be configured to perform feature 602 of method 600.

The application processor may be configured to determine the device context (i.e., the running application/use-cases) and determine the device orientation with respect to the user. The application processor may be configured with a device context and orientation calculation engine (DCOE) to implement features 604-618 of method 600. For example, the application processor may be configured to receive inputs from the baseband modem about the partner communication device (e.g., gNB) position and direction (along with corresponding deviations) as well as receive inputs from an operating system (OS) about use-cases or applications that are running. The application processor may also be configured to receive inputs from sensor(s) and/or peripheral(s) about user proximity and read an antenna position information from a factory programmed settings table and tune to the method shown in FIG. 6 for user detection in the line of path between the partner communication device and its own antenna system. Using this information, the application processor may further be configured to calculate an angular turn required to align the antenna system with the partner communication device so as to be unimpeded by the user and/or dynamically increase/decrease the Tx power as needed. The application processor may also be configured to interface with peripheral controller(s) to provide the notifications to the user. For example, this may include interfacing with a display screen controller, an LED light controller, a soundboard controller, etc.

Figure 11:
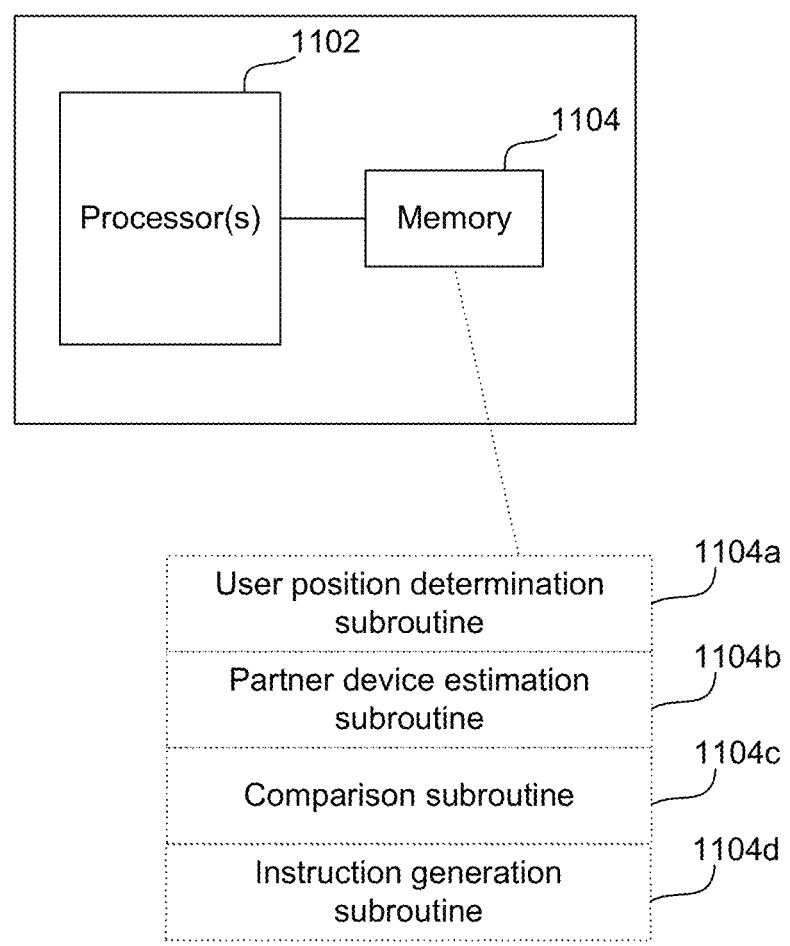
FIG. 11 exemplarily shows an internal configuration of a device with executable instructions according to some aspects.

FIG. 11 shows an internal configuration of a terminal device according to some aspects. As shown in FIG. 11, the terminal device may include processor(s) 1102 and memory 1104. Processor(s) 1102 may be a single processor or multiple processors, and may be configured to retrieve and execute program code to perform the transmission and reception, channel resource allocation, and cluster management as described herein. For example, processor(s) 1202 may be included in a baseband modem and/or an application processor of the terminal device. Processor(s) 1102 may transmit and receive data over a software-level connection.

Memory 1104 may be a non-transitory computer readable medium storing sub-routine instructions 1104a, 1104b, 1104c, and/or 1104d. Memory 1104 may be a single memory or may be multiple memories, and may be included as internal memories to processor(s) 1102 or may be external to processor(s) 1102. For example, a first memory component with subroutine 1104b may be located in conjunction with a processor in the baseband modem of the terminal device, and a second memory component with subroutines 1104a, 1104c, and 1104d may be located in conjunction with an application processor of the terminal device. Memory 1104 may be a non-transitory computer readable medium storing instructions for one or more of: a user position determination subroutine 1104a, a partner communication device estimation subroutine 1104b, a comparison subroutine 1104c, and an instruction generation subroutine 1104d. For example, the group of subroutines may provide instructions to the processor(s) to perform the methods of flowcharts 600 and/or 1200.

Figure 12:
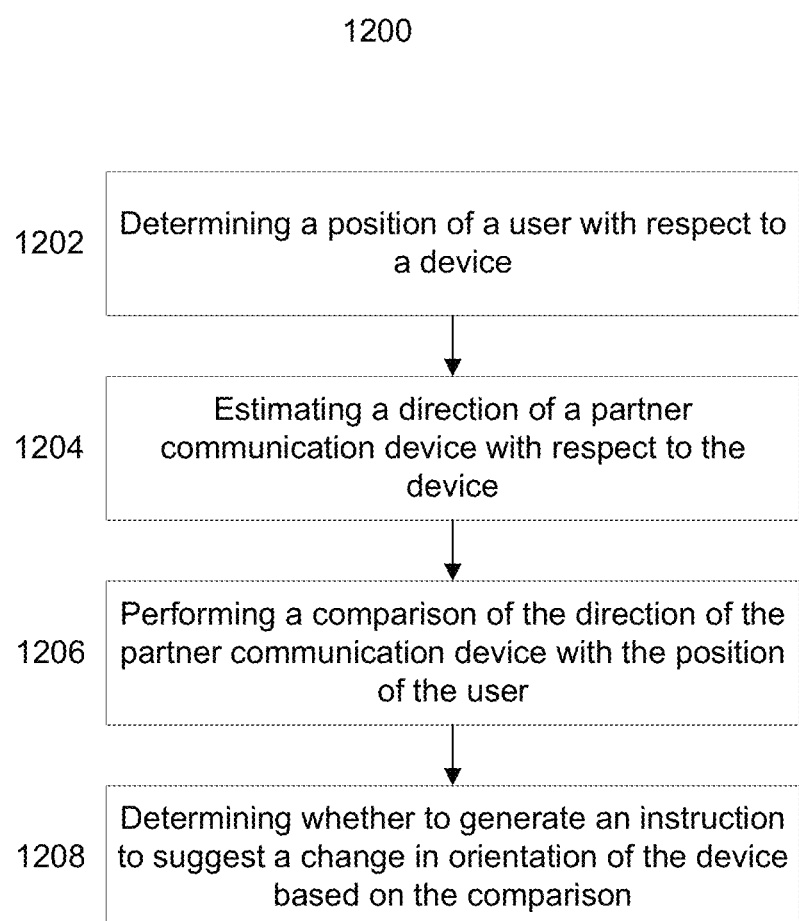
FIG. 12 exemplarily shows a flowchart according to some aspects.

FIG. 12 is an exemplary flowchart 1200 showing a method according to some aspects. The method may include determining a position of a user with respect to a device 1202; estimating a direction of a partner communication device with respect to the device 1204; performing a comparison of the direction of the partner communication device with the position of the user 1206; and based on the comparison, determining whether to generate an instruction to suggest a change in orientation of the device 1208. The method may further include other features as described in this disclosure.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a device including one or more processors configured to determine a position of a user with respect to the device; estimate a direction of a partner communication device; perform a comparison of the direction of the partner communication device with the position of the user; and based on the comparison, determine whether to generate an instruction to suggest a change in orientation of the device.

In Example 2, the subject matter of Example(s) 1 may include the one or more processors further configured to: generate the instruction; determine that the change in orientation of the device was performed; and compute a transmit power based on the change in orientation of the device.

In Example 3, the subject matter of Example(s) 2 may include that the transmit power is computed based on at least one of an updated direction of the partner communication device, an updated position of the user with respect to the device, or an application currently in use.

In Example 4, the subject matter of Example(s) 1-3 may include that the position of the user is determined based on an aimed direction of one or more peripherals operably coupled to the one or more processors.

In Example 5, the subject matter of Example(s) 4 may include the one or more peripherals including one or more of a display screen, keyboard, computer mouse, or microphone.

In Example 6, the subject matter of Example(s) 1-5 may include that the position of the user is determined based on data obtained via one or more sensors.

In Example 7, the subject matter of Example(s) 6 may include that the one or more sensors include one or more of a camera, a LIDAR sensor, a radar sensor, or an inertial measurement unit (IMU) sensor.

In Example 8, the subject matter of Example(s) 1-7 may include that the direction of the partner communication device is based on a signal received from the partner communication device.

In Example 9, the subject matter of Example(s) 8 may include that the signal is received at an antenna array operably coupled to the one or more processors, the antenna array including a plurality of antenna elements, and the device is configured to calculate a phase difference between the signal received at each of the plurality of antenna elements to estimate the direction of the partner communication device.

In Example 10, the subject matter of Example(s) 9 may include that the phase difference is used to calculate an angle of arrival of the signal received from the partner communication device.

In Example 11, the subject matter of Example(s) 1-10 may include that the comparison determines whether a communication link quality with the partner communication device is impacted by the position of the user and/or whether a signal transmit power from the device exceeds a specific absorption rate (SAR) threshold for the position of the user. The communication link quality may be determined, for example, based on a signal quality parameter (e.g. packet error rate (PER), bit error rate (BER), signal-to-interference-plus-noise ratio (SINR), or the like) failing to meet a predetermined threshold.

In Example 12, the subject matter of Example(s) 11 may include that the user is significantly impinged by the communication link's electromagnetic radio signal. This may be determined based on the regulations established by regulatory authorities such as the FCC.

In Example 13, the subject matter of Example(s) 1-12 may include that the instruction includes one or more of a notification message, a light alert, a sound alert, or a vibration alert.

In Example 14, the subject matter of Example(s) 13 may include that the instruction includes a suggestion for rotating the device or for positioning the device in a specific orientation.

In Example 15, the subject matter of Example(s) 1 may include the one or more processors further configured to implement a periodic timer for determining when to estimate the direction of the partner communication device and determine the position of the user with respect to the device.

In Example 16, the subject matter of Example(s) 15 may include that a time value of the periodic timer is dynamically adjusted based on an operating environment of the device.

In Example 17, the subject matter of Example(s) 15-16 may include that the time value is lower in a dynamic environment and higher in a static environment.

In Example 18, the subject matter of Example(s) 1-17 may include the one or more processors further configured to determine a running application in use on the device, wherein the position of the user is in part determined based on the running application in use.

In Example 19, the subject matter of Example(s) 18 may include that the running application in use is determined based on an activity level of a keyboard or a touch screen operably coupled to the one or more processors.

Example 20 is a device including: a determiner configured to determine a position of a user with respect to the device; an estimator configured to estimate a direction of a partner communication device; a comparer configured to perform a comparison of the direction of the partner communication device with the position of the user; and a generator configured to, based on the comparison, determine whether to generate an instruction to change an orientation of the device. Example 20 may further include any of the features of Examples 2-19.

Example 21 is device including: means to determine a position of a user with respect to the device; means to estimate a direction of a partner communication device; means to perform a comparison of the direction of the partner communication device with the position of the user; and means to, based on the comparison, determine whether to generate an instruction to suggest a change in orientation of the device. Example 21 may further include means to include any of the features of Examples 2-19.

Example 22 is a method including: determining a position of a user with respect to a device; estimating a direction of a partner communication device with respect to the device; performing a comparison of the direction of the partner communication device with the position of the user; and based on the comparison, determining whether to generate an instruction to suggest a change in orientation of the device.

In Example 23, the subject matter of Example(s) 22 may include generating the instruction; determining that the change in orientation of the device was performed; and computing a transmit power based on the change in orientation of the device.

In Example 24, the subject matter of Example(s) 23 may include that the transmit power is computed based on at least one of an updated direction of the partner communication device, an updated position of the user with respect to the device, or an application currently in use.

In Example 25, the subject matter of Example(s) 22-24 may include that the position of the user is determined based on an aimed direction of one or more peripherals operably coupled to the one or more processors.

In Example 26, the subject matter of Example(s) 25 may include that the one or more peripherals include one or more of a display screen, keyboard, computer mouse, or microphone.

In Example 27, the subject matter of Example(s) 22-26 may include that the position of the user is determined based on data obtained via one or more sensors including one or more of a camera, a LIDAR sensor, a radar sensor, or an inertial measurement unit (IMU) sensor.

In Example 28, the subject matter of Example(s) 22-27 may include that the direction of the partner communication device is based on a signal received from the partner communication device.

In Example 29, the subject matter of Example(s) 28 may include that the signal is received at an antenna array, the antenna array including a plurality of antenna elements, and the method further includes calculating a phase difference between the signal received at each of the plurality of antenna elements to estimate the direction of the partner communication device.

In Example 30, the subject matter of Example(s) 29 may include that the phase difference is used to calculate an angle of arrival of the signal received from the partner communication device.

In Example 31, the subject matter of Example(s) 22-30 may include that the comparison determines whether a communication link quality with the partner communication device is impacted by the position of the user and/or whether a signal transmit power from the device exceeds a specific absorption rate (SAR) threshold for the position of the user. The communication link quality may be determined, for example, based on a signal quality parameter (e.g. packet error rate (PER), bit error rate (BER), signal-to-interference-plus-noise ratio (SINR), or the like) failing to meet a predetermined threshold.

In Example 32, the subject matter of Example(s) 31 may include that the user is significantly impinged by the communication link's electromagnetic radio signal.

In Example 33, the subject matter of Example(s) 22-32 may include that the instruction includes one or more of a notification message, a light alert, a sound alert, or a vibration alert.

In Example 34, the subject matter of Example(s) 33 may include the instruction includes a suggestion for rotating the device or for positioning the device in a specific orientation.

In Example 35, the subject matter of Example(s) 22-34 may include implementing a periodic timer for determining when to estimate the direction of the partner communication device and determine the position of the user.

In Example 36, the subject matter of Example(s) 35 may include that a time value of the periodic timer is dynamically adjusted based on an operating environment of the device.

In Example 37, the subject matter of Example(s) 35-36 may include that the time value is lower in a dynamic environment and higher in a static environment.

In Example 38, the subject matter of Example(s) 22-37 may include determining a running application in use, wherein the position of the user is in part determined based on the running application in use.

In Example 39, the subject matter of Example(s) 38 may include that the running application in use is determined based on an activity level of a keyboard or a touch screen operably coupled to the one or more processors.

Example 40 is one or more non-transitory computer-readable media storing instructions thereon that, when executed by at least one processor of a terminal device, direct the terminal device to perform a method according to any one of Examples 22-39.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device comprising one or more processors configured to:
   adjust dynamically, based on an operating environment of the device, a time value of a periodic timer for a first time and a second time that are based on the periodic timer;
   determine the first time and the second time based on the time value of the periodic timer;
   decrease, when the operating environment is a dynamic environment, the time value with respect to a previous time value;
   increase, when the operating environment is a static environment, the time value with respect to the previous time value;
   determine, at the first time, a position of a user with respect to the device;
   estimate, at the second time, a direction of a partner communication device;
   perform a comparison of the direction of the partner communication device with the position of the user; and
   based on the comparison, determine whether to generate an instruction to suggest a change in orientation of the device.

2. The device of claim 1, the one or more processors further configured to:
   generate the instruction based on the determination to generate the instruction;
   determine that the change in orientation of the device was performed; and
   compute a transmit power based on the change in orientation of the device.

3. The device of claim 2, wherein the transmit power is computed based on at least one of an updated direction of the partner communication device, an updated position of the user with respect to the device, or an application currently in use.

4. The device of claim 1, wherein the position of the user is determined based on an aimed direction of one or more peripherals operably coupled to the one or more processors, wherein the one or more peripherals comprise one or more of a display screen, keyboard, computer mouse, or microphone.

5. The device of claim 1, wherein the position of the user is determined based on data obtained via one or more sensors.

6. The device of claim 5, wherein the one or more sensors comprise one or more of a camera, a light detection and ranging (LIDAR) sensor, or a radar sensor.

7. The device of claim 1, wherein the direction of the partner communication device is based on a signal received from the partner communication device.

8. The device of claim 7, wherein the signal is received at an antenna array operably coupled to the one or more processors, the antenna array comprising a plurality of antenna elements, and the device is configured to calculate a phase difference between the signal received at each of the plurality of antenna elements to estimate the direction of the partner communication device.

9. The device of claim 8, wherein the phase difference is used to calculate an angle of arrival of the signal received from the partner communication device.

10. The device of claim 1, wherein the comparison determines whether a communication link quality with the partner communication device is impacted by the position of the user and/or whether a signal transmit power from the device exceeds a specific absorption rate (SAR) threshold for the position of the user.

11. The device of claim 1, wherein the instruction comprises one or more of a notification message, a light alert, a sound alert, or a vibration alert.

12. The device of claim 11, wherein the instruction comprises a suggestion for rotating the device or for positioning the device in a specific orientation.

13. The device of claim 1, the one or more processors further configured to estimate the direction of the partner communication device and determine the position of the user with respect to the device based on an input provided by an inertial measurement unit (IMU) sensor.

14. The device of claim 1, the one or more processors further configured to determine a running application in use on the device, wherein the position of the user is in part determined based on the running application in use, wherein the running application in use is determined based on an activity level of a keyboard or a touch screen operably coupled to the one or more processors.

15. A method comprising:
adjusting dynamically, based on an operating environment of a device, a time value of a periodic timer for a first time period and a second time period that are based on the periodic timer;
determining the first time period and the second time period based on the time value of the periodic timer;
decreasing, when the operating environment is a dynamic environment, the time value with respect to a previous time value;
increasing, when the operating environment is a static environment, the time value with respect to the previous time value;
determining, at the first time period, a position of a user with respect to the device;
estimating, at the second time period, a direction of a partner communication device with respect to the device;
performing a comparison of the direction of the partner communication device with the position of the user; and
based on the comparison, determining whether to generate an instruction to suggest a change in orientation of the device.

16. The method of claim 15, further comprising:
generating the instruction based on the determination to generate the instruction;
determining that the change in orientation of the device was performed; and
computing a transmit power based on the change in orientation of the device.

17. One or more non-transitory computer-readable media storing instructions thereon that, when executed by at least one processor of a device, direct the device to:
adjust dynamically, based on an operating environment of the device, a time value of a periodic timer for a first time period and a second time period that are based on the periodic timer;
determine the first time period and the second time period based on the time value of the periodic timer;
decrease, when the operating environment is a dynamic environment, the time value with respect to a previous time value;
increase, when the operating environment is a static environment, the time value with respect to the previous time value;
determine, at the first time period, a position of a user with respect to the device;
estimate, at the second time period, a direction of a partner communication device;
perform a comparison of the direction of the partner communication device with the position of the user; and
based on the comparison, determine whether to generate an instruction to suggest a change in orientation of the device.

18. The one or more non-transitory computer-readable media of claim 17, wherein the comparison determines whether a communication link quality with the partner communication device is impacted by the position of the user and/or whether a signal transmit power from the device exceeds a specific absorption rate (SAR) threshold for the position of the user.

* * * * *